May 3, 1955 EIJI MUNEKATA ET AL 2,707,670
METHOD OF RECOVERING AMMONIA FROM DILUTE AQUEOUS
SOLUTIONS OR GASES CONTAINING THE SAME
Filed Feb. 27, 1953 2 Sheets-Sheet 1

INVENTOR.
EIJI MUNEKATA - SADASUKE IMAMOTO AND
KAZUHIKO MIHARA
BY

INVENTOR.
Eiji Munekata - Sadasuke Imamoto and
Kazuhiko Minara
BY

United States Patent Office 2,707,670
Patented May 3, 1955

2,707,670

METHOD OF RECOVERING AMMONIA FROM DILUTE AQUEOUS SOLUTIONS OR GASES CONTAINING THE SAME

Eiji Munekata, Nakano-Ku, Tokyo, Sadasuke Imamoto, Hikari-Shi, Yamaguchi-Ken, and Kazuhiko Mihara, Hioki-Gun, Kagoshima-Ken, Japan, assignors to Asahi Chemical Industry Co., Ltd., Osaka, Japan Application February 27, 1953, Serial No. 339,284

Claims priority, application Japan February 4, 1953

8 Claims. (Cl. 23—193)

This invention relates to a method of recovering ammonia from a fluid, such as a dilute aqueous solution or gas which contains ammonia in the free or combined state.

In order to recover ammonia from a dilute aqueous solution containing it in a free or compound state, ordinary evaporation processes such as distillation are employed. In distilling an aqueous solution in which ammonia is present in the form of a compound, alkali such as slaked lime is first added to the solution to convert the ammonium compound into free ammonia. In such a process, however, water is inevitably evaporated together with the ammonia, which produces a gaseous evaporation product containing a large proportion of water vapor. Accordingly the purification of said gaseous product is extremely difficult to effectuate, and, in addition, requires the expenditure of a large amount of heat. Therefore, the process is impracticable for industrial purposes.

On the other hand, the complete recovery of ammonia from a dilute gas containing ammonia, which exists in a state of either a compound or in the free state cannot be accomplished by the usual method in which the free gas is absorbed in water.

An approach to the problem is set forth in Japanese Patent No. 123,122. According to this method, a dilute aqueous solution of ammonia is treated with a large quantity of air which flows countercurrently thereto to obtain dilute ammonia gas, which in turn is converted into an ammonium sulphate solution by employing sulphuric acid as the absorbent. The ammonium sulphate solution thus obtained is then concentrated by boiling and recovered as solid ammonium sulphate. This method, however, involves the following disadvantages, viz., (1) for recovery of ammonia from a solution thereof in which ammonia exists in the form of a compound, alkali must be added in a considerable excess to convert the compound into free ammonia, particularly where a large quantity of the aqueous solution is to be treated; (2) this method requires a bulky gasifying tower and a large absorption tower for effecting the countercurrent contact of the dilute aqueous solution of ammonia with air; and (3) prevents the recirculation of the ammonia in the process because the ammonia is recovered as ammonium sulphate, ammonia can not be readily reused or recirculated.

The main object of the present invention is to provide a method of recovering ammonia from a dilute aqueous solution or gas containing the same in an economical and efficient manner.

Another object of the present invention is to provide a method by which ammonia is recovered in a higher purity by the use of simpler and smaller processing equipment than in the above-mentioned prior methods.

A further object of the present invention is to provide a continuous method of recovering ammonia from a fluid containing the same for its recirculatory use.

Other and further objects of the present invention will appear from the more detailed description which follows, it being understood that such detailed description is given by way of illustration only and not by way of limitation.

In connection with such more detailed description, reference is made to the accompanying drawings, in which, Fig. 1 shows diagrammatically an arrangement for recovery of ammonia from an aqueous solution containing the same in a free state or in compound form such as ammonium sulphate.

Figure 1:
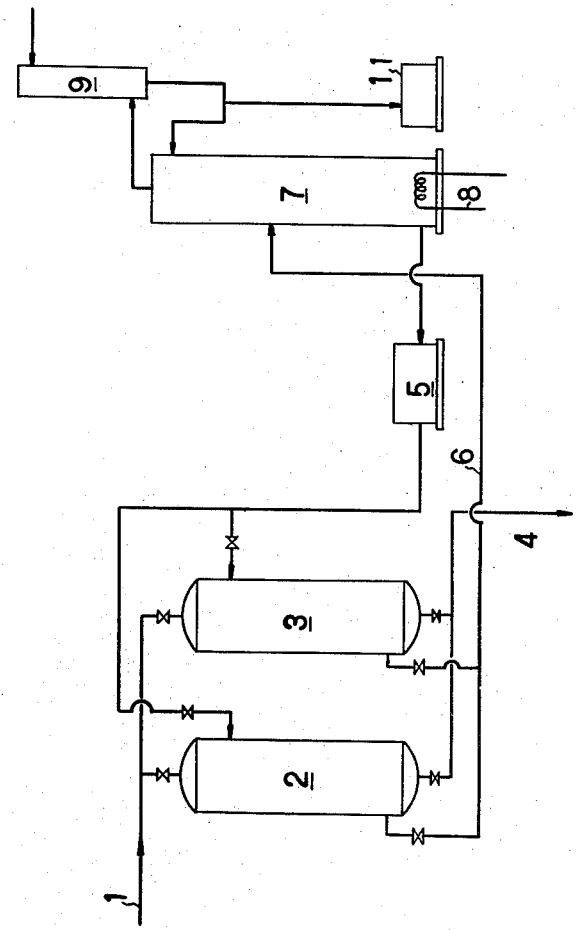

New and unexpected results are obtained by the prior treatment of an ammonia containing fluid with suitable ion exchange resins and then treating as described in detail hereinafter. Ion exchange resins are classified into two groups, one of which is cation exchange and the other is anion exchange. A cation exchange resin has acidic radicals such as $-SO_3H$ or $-COOH$, hydrogen therein being substituted by another cation. Thus, in general, an ion exchange resin may be symbolized as R—X in which X is a radical containing hydrogen capable of being substituted by another radical. A cation exchange resin (R—X), in which X is, for example, $-COOH$, is brought into contact with an aqueous ammonia solution and ammonium ion is adsorbed to the resin according to the following reaction:

$$R-COOH + NH_4(OH) \rightarrow R-COONH_4 + H_2O$$

A cation exchange resin in which X is a strong acidic radical such as $-SO_3H$ may be employed, but in this case the capacity for adsorbing ammonium is inferior to that of the aforesaid resin having a weak acidic radical such as $-COOH$. By treating the resin with acid such as HCl or $H_2SO_4$, the adsorbed $-NH_4$ reacts with the acid as follows:

$$2R-COONH_4 + H_2SO_4 \rightarrow 2R-COOH + (NH_4)_2SO_4$$

In the case in which monoammonium phosphate is used instead of sulphuric acid, the reaction is as follows:

$$R-COONH_4 + NH_4 \cdot H_2PO_4 \rightarrow R-COOH + (NH_4)_2HPO_4$$

Thus monoammonium phosphate reacts with ammonia adsorbed to the resin thereby being converted to diammonium phosphate, while the resin returns to its initial form and recovers its adsorbing capacity through regeneration. On the other hand, anion exchange resins having an amine radical such as $\equiv N$, $=NH$ or $-NH_2$ tend to dissociate by treatment with an aqueous solution and convert the acid amine radical into $-NH_3OH$. In the case where a neutral salt such as ammonium sulfate is decomposed, the reaction is as follows:

$$2R-NH_3OH + (NH_4)_2SO_4 \rightarrow (R-NH_3)_2SO_4 + 2NH_4OH$$

Then, the resin is treated with alkali such as caustic soda and the following reaction occurs:

$$(R-NH_3)_2SO_4 + 2NaOH \rightarrow 2R-NH_3OH + Na_2SO_4$$

As is seen from these equations, the sulfuric acid radical adsorbed on the resin is removed as $Na_2SO_4$ and the adsorbing capacity is regenerated and recovered.

According to the present invention, a dilute aqueous solution or gas containing ammonia in a free state is passed through a layer or layers of cation exchange resin to adsorb the ammonia constituent therein onto the resin in accordance with the above mentioned principles. A mixed salt solution of monoammonium phosphate and diammonium phosphate containing the former in a major proportion is passed through said resin layer or layers to obtain an aqueous solution rich in diammonium phosphate, since the ammonia which was adsorbed on the resin reacts with monoammonium phosphate to form diammonium phosphate. The resin, being thereby deprived of ammonia is regenerated and recovers its adsorption capacity.

By providing a plurality of cation exchange resin adsorption towers which are to be operated alternately for adsorption and for desorption, the ammonia constituent in a dilute aqueous solution or gas containing ammonia in a free state can be recovered as diammonium phosphate in a continuous and recirculatory manner at a high recovery efficiency with a relatively small scale processing apparatus.

The mixed salt solution of monoammonium phosphate and diammonium phosphate rich in the latter is then heated under elevated, normal or reduced pressure to decompose the diammonium phosphate. The ammonia liberated by the decomposition is distilled together with the concurrently generated water vapor, and recovered in a form of aqueous ammonia of a relatively high concentration, or, if necessary, in the form of ammonia gas, which can readily be reused or recirculated.

When the heat decomposition and distillation is effected under a high pressure, the decomposition rate is so high that the apparatus therefor may be of smaller size. Although it is necessary for recovering ammonia in the form of an aqueous solution to cool the gas which is distilled, such a cooling is easily effected under high pressure and this provides the further advantage that the amount of cooling required is small. For operation at normal pressure, the apparatus may be of simple construction, since the specific mechanical features used at higher pressures may be omitted. However, the operation at normal pressure requires that a larger amount of heat be absorbed for obtaining aqueous ammonia. Under reduced pressure, the decomposition of diammonium phosphate takes place at a lower rate, but the heating temperature may be kept low. The cooling operation in the formation of aqueous ammonia is somewhat difficult because the temperature approaches room temperature.

The mixed solution of monoammonium phosphate and diammonium phosphate in which the proportion of the latter is diminished by the above mentioned decomposition and distillation treatment may be reused as the ammonia desorbent for the regeneration of the cation exchange resin.

In the above description, principal reference is made to an aqueous solution of ammonia in which ammonia is in the free state. When ammonia is in a compound form, the solution must be pretreated by passing it through a layer or layers of anion exchange resin whereby the anions are adsorbed and ammonia in the aqueous solution is converted into a free state. The subsequent treatments are substantially the same as mentioned above. In order to make the anion exchange resin reactive, the latter is washed with a small quantity of alkali, and it readily recovers its adsorption capacity.

When ammonia is to be recovered from a dry coal distillation gas containing ammonia in an amount of about 1% by volume, or from the purge gas produced from ammonia synthesis containing about 50% by volume of ammonia, such a dilute ammonia containing gas is treated just in the same manner as the dilute aqueous ammonia solution aforementioned.

Referring now to the drawings, some practical examples will be described below.

*Example 1*

Referring to Fig. 1, waste water, which is obtained from a cuprammonium rayon manufacturing process of 8 ton daily production and contains 500 mg./l. of free ammonia constituent, is fed through a conduit 1 at a rate of 500 m.$^3$/hr. into a vessel 2 containing cation exchange resin, "Amberite IRC–50" or styrene resin having —COOH radical, therein. There is provided another vessel 3 which also contains the same cation exchange resin therein. These two vessels are operated alternately for the adsorption and the desorption, that is to say, one, for Example 2, is operated for the adsorption while the other 3 is operated to recover the adsorption capacity of the resin. The vessel 3 is under desorption treatment while the vessel 2 is being employed for adsorption. The waste water from the conduit 1 passes through the cation exchange resin layers in the vessel 2 and the ammonia constituent in the waste water is adsorbed on the resin, the remaining water being discharged through a drain pipe 4. When the waste water is fed under space velocity of 10 m.$^3$/m.$^3$ resin volume per hour, for 12 hrs., 8 mols of ammonia per weight of dry resin is adsorbed. Should the operation be continued for more than the aforementioned time, a tendency of letting ammonia once adsorbed escape from the resin greatly increases. As about 92% of the whole ammonia contained in the waste water is adsorbed on the resin in the vessel 2, the vessel 2 may be of a much smaller size in comparison to the required size of the gasifying tower in the prior gasifying process in which the recovery efficiency in the tower is about 70%.

A mixed solution of monoammonium phosphate 10 g./100 cc. and diammonium phosphate 3 g./100 cc. contained in a reservoir 5 is fed to the vessel 3 now containing cation exchange resin, on which ammonia is adsorbed so that no more ammonia can be adsorbed. The monoammonium phosphate reacts with the ammonia to form diammonium phosphate. When the mixed solution is then fed under space velocity of 10 m.$^3$/m.$^3$ resin volume per hour, for 6 hrs., the rate of desorption of ammonia is 67%. In other words, it is possible to continuously use the resin within 67% of the initial adsorbing capacity thereof.

The mixed solution of the phosphates thus enriched in diammonium phosphate is introduced through a conduit 6 into a heat decomposition and distillation tower 7 and heated by a heater 8. From the top opening of the tower, ammonia gas of a high concentration is discharged, which gas is then introduced into an absorption tower 9, to which water is supplied through a pipe 10. The ammonia gas in the tower 9 is absorbed by the water to form an aqueous ammonia of appropriate concentration. The aqueous ammonia is then introduced into a reservoir 11. This ammonia solution is ready for use in the cuprammonium rayon manufacturing.

The mixed solution of the phosphates heated in the tower and enriched in monoammonium phosphate is returned to the reservoir 5, and recirculated for the desorption of the cation exchange ion saturated with ammonia.

When the resin in the vessel 2 has been saturated with ammonia, the vessel 2 is cut out of the adsorption circuit and inserted into the desorption circuit through the reservoir 5, while the other vessel 3, resin in which has now recovered its adsorption capacity, is cut into the adsorption circuit through the conduits 1 and 4.

*Example 2*

Figure 2:
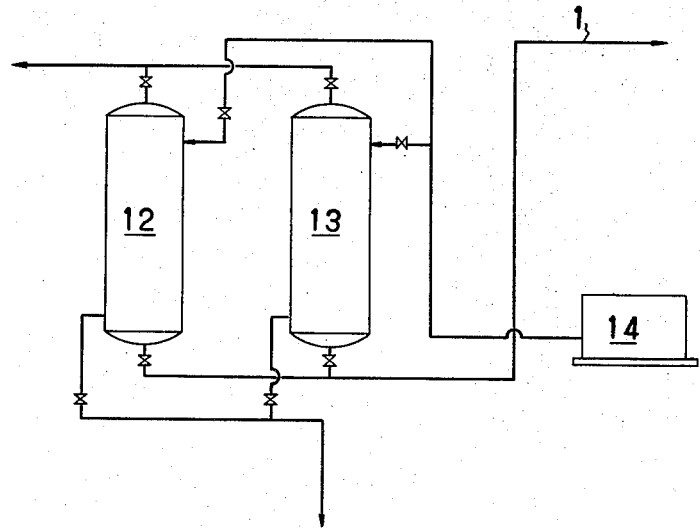
Fig. 2 shows diagrammatically an arrangement for a preliminary treatment of an aqueous solution of ammonia in a compound form for conditioning the same ready for processing in the apparatus shown in Fig. 1.

Referring to Fig. 2, aqueous ammonium sulphate solution containing, for example, 450 mg./l. as ammonia is fed through a vessel 12 containing anion exchange resin "Dowex 2" therein. There is provided another vessel 13 in which anion exchange resin is set. These vessels 12 and 13 are alternately operated for the adsorption and the desorption, in a similar manner to the vessels 2 and 3 in Fig. 1. When the aqueous ammonium sulphate solution is fed under space velocity of 10 m.$^3$/m.$^3$ resin volume per hour, for 4 hrs., sulphuric acid radical is adsorbed at a rate of 118 grams per kg. of the dry resin. The adsorption rate of sulphuric acid radical is 89%. It is now assumed that the vessel 12 is being operated for the adsorption, while the vessel 13 is being under desorption treatment. The ammonium sulphate solution, passing through the vessel 12, is adsorbed of its sulphuric acid radical and converted into an aqueous solution containing free ammonia, which is then fed through the conduit 1 to the apparatus shown in Fig. 1 and processed just as described in Example 1. When resin in the vessel 12 has been saturated with sulphuric acid radical, it is cut out of the adsorption circuit, and the other vessel 13, resin in which has now recovered its adsorption capacity, is cut into the adsorption circuit. The vessel 12 is now cut into a desorption circuit through a caustic soda solution reservoir 14, from which 5% caustic soda solution is fed under space velocity of 3 m.³/m.³ resin volume per hour, for 4 hrs., whereby a desorption rate of 95.6% is obtained. Thereafter, the desorbed resin is reused for adsorbing sulphuric acid radical.

*Example 3*

Figure 3:
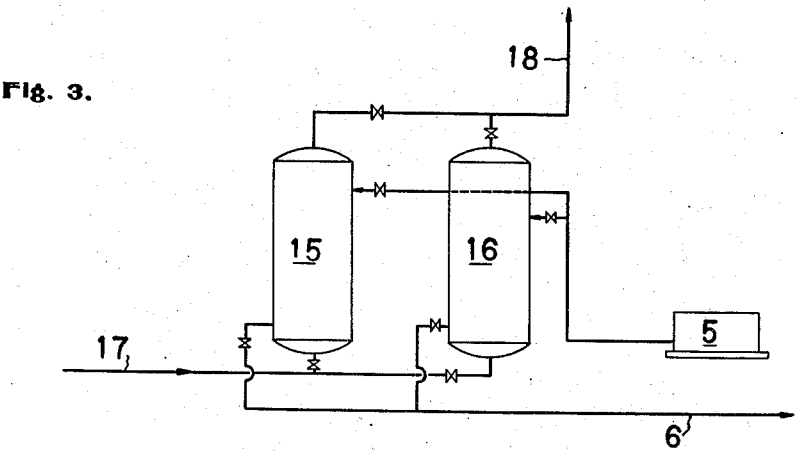
Fig. 3 shows diagrammatically an arrangement for recovery of ammonia from a gas containing the same.

Referring to Fig. 3, the purge gas of ammonia synthesis containing about 50% by volume of ammonia is fed through a conduit 17 into one or the other of two vessels 15 and 16, each of which contains cation exchange resin, like the vessels 2 and 3 in Fig. 1, respectively. The ammonia in the purge gas is adsorbed on the resin in the vessel 15 or 16, and the residue gas is exhausted through a conduit 18. When one of the vessels 15 and 16, for example 15, has been saturated with ammonia, it is cut out of the adsorption circuit, and cut into a desorption circuit through the reservoir 5 containing therein a mixed solution of monoammonium phosphate and diammonium phosphate rich in the former and recovers its adsorption capacity, in the same manner as described in connection with Fig. 1. The other vessel 16, resin in which having its adsorption capacity recovered, is now cut into the adsorption circuit through the conduits 17 and 18.

The mixed solution of the phosphates enriched in diammonium phosphates while passing through the ammonia saturated resin in the desorption circuit, is fed through the conduit 6 into the heat decomposition and distillation tower shown in Fig. 1 and further procedure is in the same manner as in Fig. 1.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

We claim:

1. A method of recovering ammonia from a dilute aqueous solution containing the same comprising, passing said solution through a layer of a cation exchange resin which has been brought into equilibrium with said solution to adsorb the ammonia from said solution, treating said resin with a solution containing a substantial amount of monoammonium phosphate and a lesser amount of diammonium phosphate to thereby convert a portion of monoammonium phosphate into diammonium phosphate by reaction with the adsorbed ammonia, this treatment serving to regenerate said cation exchange resin, heating the solution of phosphates after treatment with said resin to decompose a portion of the diammonium phosphate therein and to distill off ammonia from said decomposition, said decomposition converting the diammonium phosphate into monoammonium phosphate and ammonia, and recirculating the so-treated phosphate solution thereby enriched with monoammonium phosphate for further treatment of the cation exchange resin which has been treated with the aqueous solution containing ammonia.

2. A method according to claim 1, wherein said heat decomposition and distillation of the mixed solution of the phosphates is carried out under elevated pressure.

3. A method according to claim 1, wherein said heat decomposition and distillation of the mixed solution of the phosphates is carried out at atmospheric pressure.

4. A method according to claim 1, wherein said heat decomposition and distillation of the mixed solution of the phosphates is carried out under reduced pressure.

5. A method according to claim 1, wherein ammonia is recovered from an aqueous solution containing ammonia in the form of a compound, and said solution is first passed through a layer of an anion exchange resin to convert the compound of ammonia into ammonia in the free state whereafter the resulting aqueous solution is treated with a cation exchange resin as in claim 1.

6. A method as in claim 5, wherein said anion exchange resin is regenerated by treatment with a dilute aqueous alkali solution.

7. A method of recovering ammonia from a dilute aqueous solution containing the same comprising, passing said solution through a layer of a cation exchange resin which has been brought into equilibrium with said solution to adsorb the ammonia from said solution, and to substantially saturate said resin, treating said resin with a solution containing a substantial amount of monoammonium phosphate and a lesser amount of diammonium phosphate to thereby convert a portion of monoammonium phosphate into diammonium phosphate by reaction with the adsorbed ammonia, this treatment serving to regenerate said cation exchange resin, heating the solution of phosphates after treatment with said resin to decompose a portion of the diammonium phosphate therein and to distill off ammonia from said decomposition, said decomposition converting the diammonium phosphate into monoammonium phosphate and ammonia, and recirculating the so-treated phosphate solution thereby enriched with monoammonium phosphate for further treatment of the cation exchange resin which has been treated with the aqueous solution containing ammonia.

8. A method of recovering ammonia from a dilute fluid containing ammonia in the free state comprising, passing said fluid through a layer of a cation exchange resin which has been brought into equilibrium with said fluid and thereby adsorbing the ammonia from said fluid onto said resin, treating said resin with a solution containing a substantial amount of monoammonium phosphate and a lesser amount of diammonium phosphate to thereby convert a portion of the monoammonium phosphate into diammonium phosphate by reaction with the ammonia adsorbed onto said resin, the resin being thereby regenerated, heating the reacted phosphate solution to decompose a portion of the diammonium phosphate into ammonia and monoammonium phosphate and to distill the ammonia, and recirculating the so-treated phosphate solution for treatment of the cation exchange resin which has adsorbed ammonia from the starting fluid.

References Cited in the file of this patent

UNITED STATES PATENTS 2,184,943     Pattock et al.     Dec. 26, 1939

OTHER REFERENCES

Kunin and Myers book entitled "Ion Exchange Resins," pages 2, 123, 124; 1950 edition, John Wiley and Sons, Inc., New York.